(12) United States Patent
Socol et al.

(10) Patent No.: US 9,615,196 B2
(45) Date of Patent: Apr. 4, 2017

(54) NFC DEVICE CONFIGURATION AFTER DEVICE POWER UP

(71) Applicant: STMicroelectronics International N.V., Amsterdam (NL)

(72) Inventors: Constantin Socol, Singapore (SG); Daniel Orsatti, La Gaude (FR)

(73) Assignee: STMICROELECTRONICS INTERNATIONAL N.V., Schiphol (NL)

( * ) Notice: Subject to any disclaimer, the term of this patent is extended or adjusted under 35 U.S.C. 154(b) by 140 days.

(21) Appl. No.: 14/640,138

(22) Filed: Mar. 6, 2015

(65) Prior Publication Data

US 2016/0261973 A1    Sep. 8, 2016

(51) Int. Cl.
*H04B 5/00* (2006.01)
*H04W 4/00* (2009.01)

(52) U.S. Cl.
CPC .................................. *H04W 4/008* (2013.01)

(58) Field of Classification Search
CPC .. H04W 4/008; H04W 4/001; H04W 52/0261
USPC ................................................ 455/41.1, 41.2
See application file for complete search history.

(56) References Cited

U.S. PATENT DOCUMENTS

| 2011/0070837 | A1* | 3/2011 | Griffin | H04B 5/0062 455/41.3 |
| 2012/0092137 | A1* | 4/2012 | Buscemi | G06K 7/10237 340/10.51 |
| 2013/0137371 | A1* | 5/2013 | Haverinen | H04B 5/02 455/41.1 |
| 2013/0144793 | A1* | 6/2013 | Royston | H04W 4/001 705/72 |
| 2013/0295843 | A1* | 11/2013 | Tian | H04B 5/00 455/41.1 |
| 2013/0317924 | A1* | 11/2013 | Bush | G06Q 20/3278 705/16 |

\* cited by examiner

*Primary Examiner* — Wesley Kim
*Assistant Examiner* — Raj Chakraborty
(74) *Attorney, Agent, or Firm* — Gardere Wynne Sewell LLP

(57) ABSTRACT

A NFC tag includes an NFC controller, with a secure element coupled to the NFC controller. The secure element is to send first configuration data to the NFC controller and not second configuration data. The first configuration data comprises data to be used by the NFC controller to generate responses to initial polling and anti-collision commands from an external NFC device and not data to be used by the NFC controller in processing a command from the external NFC device involving the use of an upper layer protocol. The second configuration data comprises data to be used by the NFC controller in processing a command involving the use of an upper layer protocol from the external NFC device.

19 Claims, 2 Drawing Sheets

NFC DEVICE CONFIGURATION AFTER DEVICE POWER UP

TECHNICAL FIELD

This disclosure is related to the field of near field communication (NFC) and, more particularly, to the configuration of an unpowered NFC device or NFC device in card emulation mode after powering on.

BACKGROUND

Near field communication (NFC) is a set of standards for smartphones and similar devices utilized to establish radio communication between two devices by touching them together or bringing them into proximity, typically at a distance of 10 cm or less.

NFC uses electromagnetic induction between two loop antennas located within each other's near field, effectively forming an air-core transformer. It operates within globally available and unlicensed radio frequency bands, such as 13.56 MHz, and at rates ranging from 106 kbit/s to 424 kbit/s. NFC involves an initiator and a target; the initiator actively generates an RF field that can power a passive target, an unpowered chip called a "tag". This enables NFC targets to take simple form factors such as stickers, key fobs, or cards that do not use batteries.

NFC tags store data (typically between 96 and 4,096 bytes) and may be read-only, but may alternatively be rewriteable. The tags can securely store personal data such as debit and credit card information, loyalty program data, personal identification numbers, and networking contacts, among other information. They can be custom-encoded by their manufacturers or use the specifications provided by the NFC Forum, an industry association.

In addition to communication between a powered NFC device and an unpowered NFC device, NFC peer-to-peer communication is possible, provided both devices are powered. This may be utilized for data peer-to-peer data transfers, for example. In addition, an active NFC device may emulate an NFC card in what is called a card emulation mode.

In an NFC communication between an NFC tag and an active NFC device, or between a powered NFC device in card emulation mode and an active NFC device, there is an initialization period. As per the ISO 14443 standard for such communications, the NFC tag or powered NFC device in card emulation mode is to respond to lower level protocol commands within a given period of time from application of an unmodulated electric field by the active NFC device. In order to respond to those commands, provided there is no non-volatile memory available, the NFC tag or powered NFC device in card emulation mode first loads configuration data, and then responds to those commands based upon the configuration data. Therefore, the NFC tag or powered NFC device in card emulation mode is preferably able to load the configuration data and respond to the commands in the given period of time.

While certain configurations wherein the NFC tag or powered NFC device in card emulation mode are able to load the configuration data within the given period of time are known, additional configurations may be desirable. Therefore, new methods of handling data during the initialization period are desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An electronic device includes an NFC controller, with a secure element coupled to the NFC controller. The secure element is to send first configuration data to the NFC controller and not second configuration data. The first configuration data includes data to be used by the NFC controller to generate responses to initial polling and anti-collision commands from an external NFC device and not data to be used by the NFC controller in processing a command from the external NFC device involving the use of an upper layer protocol. The second configuration data includes data to be used by the NFC controller in processing a command involving the use of an upper layer protocol from the external NFC device.

The NFC controller may be further configured to receive the initial polling and anti-collision commands from the external NFC device and respond thereto based upon the first configuration data. In addition, an elapsed time from powering on of the NFC controller to responding to the initial polling and anti-collision commands from the external NFC device may be within an initialization time period, such as no more than 5 ms.

The NFC controller may be further configured to receive the command involving the use of the upper layer protocol from the external NFC device, and send a wait period request to the external NFC device that instructs the external NFC device to wait a given period of time to receive a response to the command involving the use of the upper layer protocol. The secure element may be further configured to send the second configuration data to the NFC controller during the given period of time. The NFC controller may be further configured to send a response to the command involving the use of the upper layer protocol to the external NFC device.

A method aspect is directed to method including sending first configuration data and not second configuration data from a secure element to a NFC controller. The first configuration data includes data to be used by the NFC controller to generate responses to initial polling and anti-collision commands from an external NFC device and not data to be used by the NFC controller in processing a command from the external NFC device involving the use of an upper layer protocol. The second configuration data includes data to be used by the NFC controller in processing a command involving the use of an upper layer protocol from the external NFC device.

Another aspect is directed to a system including a first NFC device configured to emit an electric field from. The system also includes a second NFC device in proximity to the first NFC device and being powered by the electric field emitted thereby. The second NFC device has a NFC controller, and a secure element configured to send first configuration data and not second configuration data to the NFC controller. The first configuration data includes data to be used by the NFC controller to generate responses to initial polling and anti-collision commands from the first NFC device and wherein the second configuration data includes data to be used by the NFC controller in processing a command from the first NFC device involving the use of an upper layer protocol.

A further aspect is directed to a method that includes emitting an electric field from a first near field communications (NFC) device so as to power a second NFC device in proximity thereto. The method also includes receiving first configuration data sent by a secure element of the second NFC device, at a NFC controller of the second NFC device. The first configuration data is data to be used by the NFC controller to generate a response to lower level protocol commands from the first NFC device, and not data to be used by the NFC controller in processing a higher level protocol command from the first NFC device.

DETAILED DESCRIPTION

Figure 1:
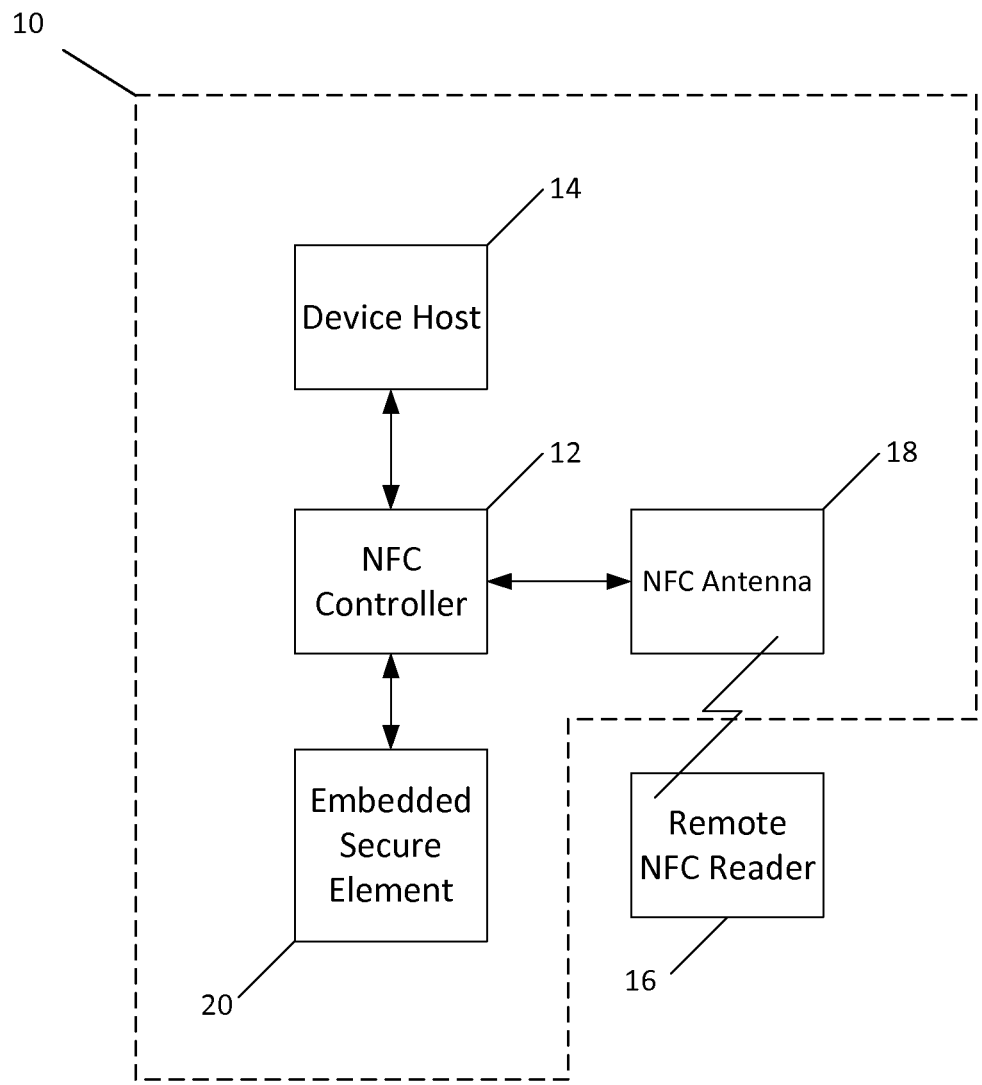
FIG. 1 is a block diagram of a NFC enabled electronic device such as may be used with the configuration techniques described herein.

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Like reference numbers in the drawing figures refer to like elements throughout, and reference numbers separated by century, as well as reference numbers with prime notation, indicate similar elements in other applications or embodiments.

With initial reference to FIG. 1, an electronic device 10 is now described. The electronic device 10 may be any NFC enabled device, such as a smartphone, tablet, or smartwatch. The electronic device 10 includes a central processor, referred to here as a device host 14, which may be a system on chip. The device host 14 is coupled to a NFC controller 12, which acts as a communications interface (e.g. in some examples, a universal asynchronous receiver/transmitter) for NFC communications, an embedded secure element 20 which provides a secure memory and execution environment for security conscious transactions such as financial transactions, and an NFC antenna 18 by which the device host 14 transmits or receives data via NFC. An external NFC device 16, communicates with the NFC controller 12 via the NFC antenna 18.

The electronic device 10 may be operating in the card emulation mode, in which the NFC controller 12 simulates the behavior of an NFC card, such as an ISO-14443 smart-card. This allows the electronic device 10 to substitute for a NFC card used in traditional security applications such credit card payments, identification badging, etc.

When the electronic device 10 is operating in the card emulation mode, or when the electronic device 10 is an unpowered NFC device such as a tag, and when the electronic device 10 lacks nonvolatile memory, the NFC controller 12 is to, after booting up, load configuration information that enables it to properly communicate with the external NFC device 16 using NFC. This configuration information includes configuration information to be used by the NFC controller 12 to respond to both lower level protocol commands and higher level protocol commands. NFC communications protocols, such as ISO 14443, allot a given amount of time after booting up (i.e. activation of the NFC field) for the unpowered device or device in card emulation mode to have loaded the configuration data and to be able to respond to received commands. With respect to ISO 14443, the given amount of time is 5 ms.

One possible place to store this configuration information is in an additional non-volatile memory (not shown) in the electronic device 10. This would allow the complete configuration information to be retrieved by the NFC controller 12 within the given amount of time, and for the NFC controller 12 to thus be able to respond to commands by the end of that amount of time. However, the addition of such a non-volatile memory (not shown) may serve to increase the cost of the electronic device 10, and may additionally take up room within the electronic device 10 that could have been otherwise used for other components.

To that end, the configuration information may instead be stored in the secure element 20, which includes a non-volatile memory therein. However, since the secure element 20 provides a secure memory and execution environment, the secure element has a boot up time associated with it as well. If the entirety of the configuration information (i.e., such as that enabling the NFC controller 12 to respond to both lower level protocol commands and higher level protocol commands) is to be loaded from the secure element 20, due to the boot up time of the secure element 20, the configuration information may not reach the NFC controller 12 by the end of the given period of time, causing an error and a lack of NFC communication between the NFC controller 12 and the external NFC device 16.

The Inventors have determined that only a subset of the configuration information is utilized in responding to the lower level protocol commands from the external NFC device 16, which are sent before higher level protocol commands. Thus, the configuration information is split into a first set of configuration information containing the configuration information to be used for responding to lower level protocol commands, and a second set of configuration information containing the configuration information to be used for responding to higher level protocol commands. Both the first set of configuration information and the second set of configuration information are stored in the secure element 20, however the first subset of configuration information uses less storage space than the second subset of configuration information, and hence can be loaded within the desired 5 ms time limit. For example, in some instances, it has been found that the first set of configuration information is about 10% of the size of the second set of configuration information.

Figure 2:
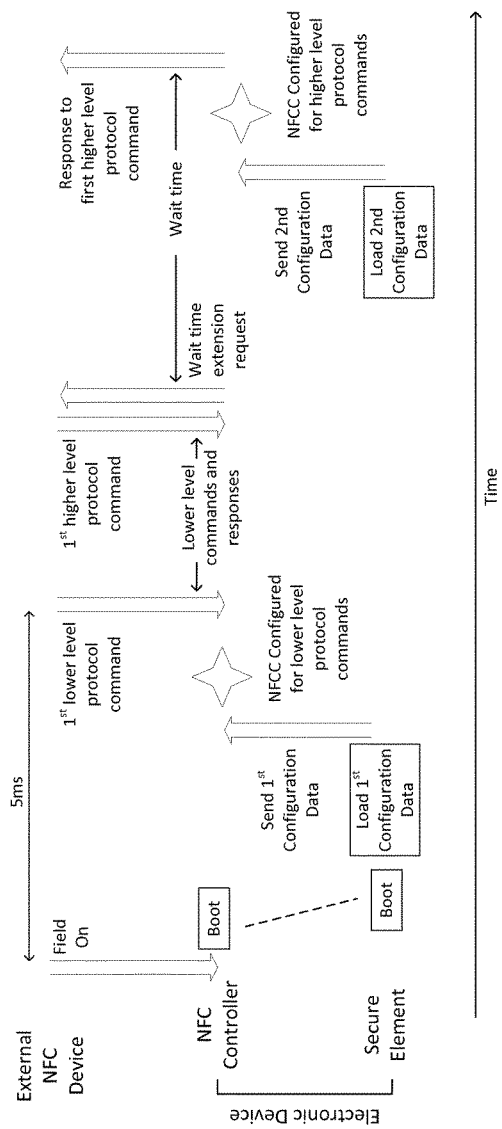
FIG. 2 is a timing diagram showing data exchanged between first and second NFC devices during configuration.

Operation of the electronic device 10 such that the secure element 20 stores the configuration information will now be described with additional reference to FIG. 2. The external NFC device 16 activates an unmodulated NFC field to power the NFC device 12. This causes the NFC controller 12 to boot up, which in turn causes the secure element 20 to boot up. Once the secure element 20 boots up, the NFC controller 12 loads therefrom the first set of configuration data, which is that configuration data that allows it to generate responses to initial polling and anti-collision commands from the external NFC device 16. These lower level protocol commands are referred to as Level 3 commands in the ISO 14443 specification.

Since the first set of configuration data is smaller in size than the second set of configuration data, the secure element 20 is able to load the first configuration data, send it to the NFC controller 12, and the NFC controller 12 is in turn able to process the first configuration data and be ready to respond to lower level protocol commands within the given time (i.e., 5 ms).

At the end of the given time, the external NFC device 16 sends the first lower level protocol command to the NFC controller 12, which is able to respond. A series of lower level protocol commands and responses then commence, until the time at which the external NFC device 16 sends the first higher level protocol command to the NFC controller 12. At this point, the NFC controller 12 is able to send a wait time extension request, for example such as that provided for in the ISO 14443 specification, to the external NFC device 16. It should be noted that the NFC controller 12 can, if desired, send multiple wait time extension requests to the external NFC device 16.

The external NFC device 16 receives the wait time extension request and waits the period of time specified for the wait time extension request. During this wait time, the secure element 20 loads the second set of configuration data and sends the second set of configuration data to the NFC controller 12. The second set of configuration data is the configuration data that allows the NFC controller 12 to generate responses to commands from the external NFC device 16 involving the use of an upper layer protocol. These higher level protocol commands are referred to as Level 4 commands in the ISO 14443 specification. The NFC controller 12 processes this second set of configuration data and is then configured to respond to higher level protocol commands. At the end of the wait time, the NFC controller 12 responds to the first higher level protocol command. A series of higher level protocol commands and response may then ensue.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An electronic device, comprising:
   a near field communications (NFC) controller; and
   a secure element coupled to the NFC controller and configured to send first configuration data to the NFC controller and not second configuration data;
   wherein the first configuration data comprises data to be used by the NFC controller to generate responses to initial polling and anti-collision commands from an external NFC device and not data to be used by the NFC controller in processing a command from the external NFC device involving the use of an upper layer NFC protocol;
   wherein the second configuration data comprises data to be used by the NFC controller in processing a command involving the use of an upper layer NFC protocol from the external NFC device;
   wherein the NFC controller is further configured to:
      receive the command involving the use of the upper layer NFC protocol from the external NFC device, and
      send a wait period request to the external NFC device that instructs the external NFC device to wait a given period of time to receive a response to the command involving the use of the upper layer NFC protocol;
   wherein the secure element is further configured to send the second configuration data to the NFC controller during the given period of time.

2. The electronic device of claim 1, wherein the NFC controller is further configured to receive the initial polling and anti-collision commands from the external NFC device and respond thereto based upon the first configuration data.

3. The electronic device of claim 2, wherein an elapsed time from powering on of the NFC controller to responding to the initial polling and anti-collision commands from the external NFC device is within an initialization time period.

4. The electronic device of claim 3, wherein the initialization time period is no more than 5 ms.

5. The electronic device of claim 1, wherein the NFC controller is further configured to send a response to the command involving the use of the upper layer NFC protocol to the external NFC device.

6. A method, comprising:
   sending first configuration data and not second configuration data from a secure element to a NFC controller;
   wherein the first configuration data comprises data to be used by the NFC controller to generate responses to initial polling and anti-collision commands from an external NFC device and not data to be used by the NFC controller in processing a command from the external NFC device involving the use of an upper layer NFC protocol;
   wherein the second configuration data comprises data to be used by the NFC controller in processing a command involving the use of an upper layer NFC protocol from the external NFC device;
   receiving the command from the external NFC device involving the use of the upper layer NFC protocol, at the NFC controller;
   sending a wait period request from the NFC controller to the external NFC device that instructs the first NFC device to wait a given period of time to receive a response to the command involving the use of the upper layer NFC protocol; and
   sending the second configuration data from the secure element to the NFC controller during the given period of time.

7. The method of claim 6, further comprising receiving the initial polling and anti-collision commands from the external NFC device and responding thereto based upon the first configuration data, using the NFC controller.

8. The method of claim 7, wherein an elapsed time from powering of the NFC controller to responding to the initial polling and anti-collision commands from the external NFC device is within an initialization time period.

9. The method of claim 6, further comprising sending a response to the command involving the use of the upper layer NFC protocol from the NFC controller to the external NFC device.

10. A system, comprising:
    a first NFC device configured to emit an electric field from;
    a second NFC device in proximity to the first NFC device and being powered by the electric field emitted thereby, the second NFC device comprising:
       a NFC controller, and
       a secure element configured to send first configuration data and not second configuration data to the NFC controller, wherein the first configuration data comprises data to be used by the NFC controller to generate responses to initial polling and anti-collision commands from the first NFC device and wherein the second configuration data comprises data to be used by the NFC controller in processing a command from the first NFC device involving the use of an upper layer NFC protocol;

wherein the first NFC device is further configured to send the command involving the use of the upper layer NFC protocol to the second NFC device;

wherein the NFC controller is further configured to send a wait period request to the first NFC device that instructs the first NFC device to wait a given period of time to receive a response to the command involving the use of the upper layer NFC protocol;

wherein the secure element is further configured to send the second configuration data to the NFC controller during the given period of time;

wherein the NFC controller is further configured to send a response to the command involving the use of the upper layer NFC protocol to the first NFC device.

11. The system of claim 10, wherein the first NFC device is configured to send the initial polling and anti-collision commands to the second NFC device; and wherein the NFC controller is further configured to respond to the initial polling and anti-collision commands based upon the first configuration data.

12. A method, comprising:
emitting an electric field from a first near field communications (NFC) device so as to power a second NFC device in proximity thereto; and
receiving first configuration data sent by a secure element of the second NFC device and not second configuration data, at a NFC controller of the second NFC device;
wherein the first configuration data comprises data to be used by the NFC controller to generate responses to initial polling and anti-collision commands from the first NFC device and wherein the second configuration data comprises data to be used by the NFC controller in processing a command from the first NFC device involving the use of an upper layer NFC protocol;
receiving the command from the first NFC device involving the use of the upper layer NFC protocol, at the NFC controller;
sending a wait period request from the NFC controller to the first NFC device that instructs the first NFC device to wait a given period of time to receive a response to the command involving the use of the upper layer NFC protocol; and
receiving the second configuration data sent by the secure element, at the NFC controller, during the given period of time.

13. The method of claim 12, further comprising receiving the initial polling and anti-collision commands from the first NFC device and responding thereto based upon the first configuration data.

14. The method of claim 13, wherein an elapsed time from powering of the second NFC device to responding to the initial polling and anti-collision commands from the first NFC device is within an initialization time period.

15. The method of claim 12, further comprising sending a response to the command involving the use of the upper layer NFC protocol from the NFC controller to the first NFC device.

16. A method, comprising:
emitting an electric field from a first near field communications (NFC) device so as to power a second NFC device in proximity thereto; and
receiving first configuration data sent by a secure element of the second NFC device, at a NFC controller of the second NFC device;
wherein the first configuration data comprises data to be used by the NFC controller to generate a response to lower level protocol commands from the first NFC device, and not data to be used by the NFC controller in processing a higher level NFC protocol command from the first NFC device;
receiving the higher level NFC protocol command from the first NFC device, at the NFC controller;
sending a wait period request from the NFC controller to the first NFC device that instructs the first NFC device to wait a given period of time to receive a response to the higher level command; and
receiving the second configuration data sent by the secure element, at the NFC controller, during the given period of time.

17. The method of claim 16, wherein the higher level NFC protocol command comprises a command involving the use of an upper layer NFC protocol.

18. The method of claim 16, further comprising receiving the lower level protocol commands from the first NFC device and responding thereto based upon the first configuration data.

19. The method of claim 16, further comprising sending a response to the higher level command from the NFC controller to the first NFC device.

* * * * *